Sept. 5, 1939.　　　　E. GERECKE　　　　2,171,930

VACUUM DISCHARGE APPARATUS

Filed Aug. 10, 1938　　　2 Sheets-Sheet 1

Inventor
Eduard Gerecke
by [signature]
atty.

Sept. 5, 1939.  E. GERECKE  2,171,930
VACUUM DISCHARGE APPARATUS
Filed Aug. 10, 1938  2 Sheets—Sheet 2
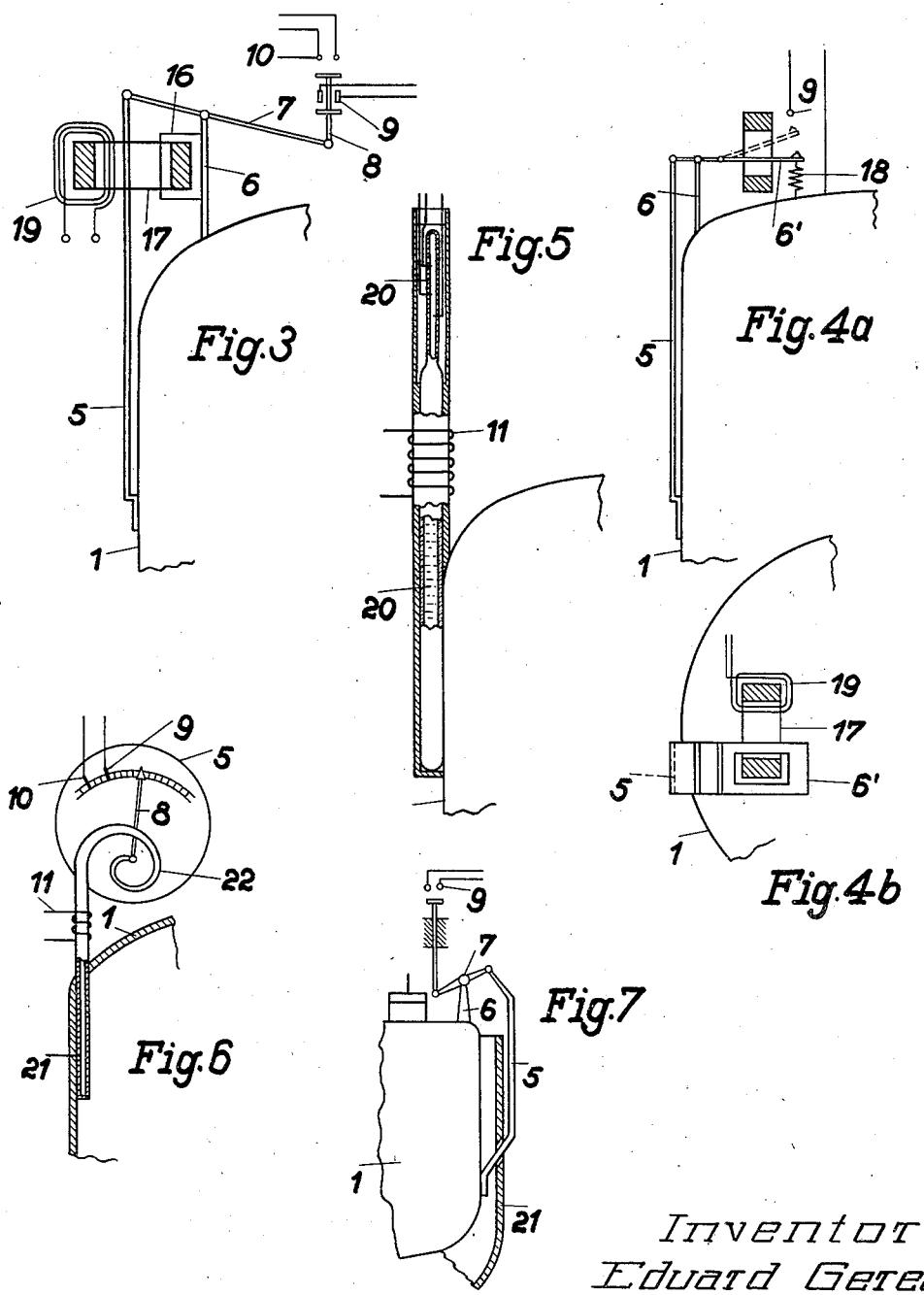
Inventor
Eduard Gerecke
by [signature]
atty.

Patented Sept. 5, 1939

2,171,930

UNITED STATES PATENT OFFICE 2,171,930

VACUUM DISCHARGE APPARATUS

Eduard Gerecke, Berlin-Grunewald, Germany, assignor to Julius Pintsch Kommanditgesellschaft, Berlin, Germany Application August 10, 1938, Serial No. 224,223
In Germany August 11, 1937

13 Claims. (Cl. 175—363)

The invention relates to an arrangement for keeping constant the gas or vapour pressure in vacuum vessels, in particular in mercury-vapour current-converting apparatus.

In the case of mercury-vapour current-converting apparatus there is the problem of keeping the vapour pressure very constant during working even in the case of varying loads in order to prevent arcing-back and other disturbances. It has already been proposed to add a heavy inert gas to the mercury-vapour charge for the purpose of producing a sufficiently high gas pressure when the vacuum vessel is cold or in the case of light loads.

The present invention has for object in particular to prevent the vapour pressure from becoming too high in the case of heavy loads. The pressure can be regulated as is known by the regulation of the temperature of the vessel of the current-converting apparatus. In order to maintain a constant pressure it is however not sufficient then merely to keep constant the temperature of the peripheral wall of the vessel. It has in fact been found that the vapour pressure obtaining in the neighborhood of the anodes is so much the greater than the saturation pressure pertaining to the wall temperature, as the greater is the current. If, for a given unloaded or very lightly loaded current-converting apparatus with correct vapour pressure, the wall temperature is for example 81° C., and this temperature is kept constant with increasing load, it is found that, for example in the case of a discharge current of 300 A. (approximately full load) in the interior of the vessel, there is actually a vapour pressure which (in the case of the hereinbefore assumed small load) corresponds to a wall temperature of 94° and is consequently (in the case of mercury) twice as great. The effective wall pressure would consequently, in order to maintain the correct vapour pressure even with the load of 300 A., have to be in the case of this load 81°−13°=68° C. The vessel of the current-rectifying apparatus must consequently be kept colder the greater is the load. There results empirically, for the dependence on the load of the wall temperature necessary for producing a constant vapour pressure, a straight line, such as is represented for example in Figure 1. Since, however, with a heavy load or excess load the ionic density is itself higher, it may be advantageous to produce by suitable cooling a somewhat smaller vapour pressure than is indicated by the straight line, and, indeed, in such a manner that there results approximately a parabola (Figure 1) for the temperature-load curve.

The subject-matter of the invention is an arrangement by means of which the correct temperature of the vessel wall is regulated automatically for each load and consequently the vapour pressure in the current-converting apparatus can be kept constant. According to the invention there is employed for the regulation of the temperature a heat-sensitive device the expansion of which is made dependent in the first place on the temperature of the vessel, and further on a magnitude dependent on the load current of the rectifier preferably on the load current itself. The movable contact of the heat-sensitive device operates then for example the circuit of an electrical relay, which in its turn switches in and out for example the fan motor of the rectifier.

Figure 3 is a broken elevation showing a modified form.

Figures 4a and 4b show respectively broken elevation and plan of a further modification.

Figure 5 shows in broken elevation, partly in section, a further modified form.

Figure 6 shows in broken elevation, partly in section, a further modification.

Figure 7 shows an elevation, partly in section, of a further modified form.

Figure 1:
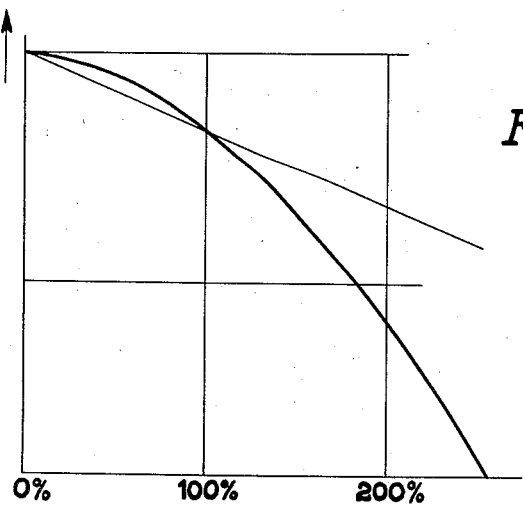
Figure 1 is a graph showing a straight line obtained by plotting wall temperature against load current for a constant vapor pressure in the vacuum vessel of a metal vapor current converting device and also showing a parabolic curve defining a relationship of wall temperature to load current which may be advantageous with excess or heavy load.
Figure 2:
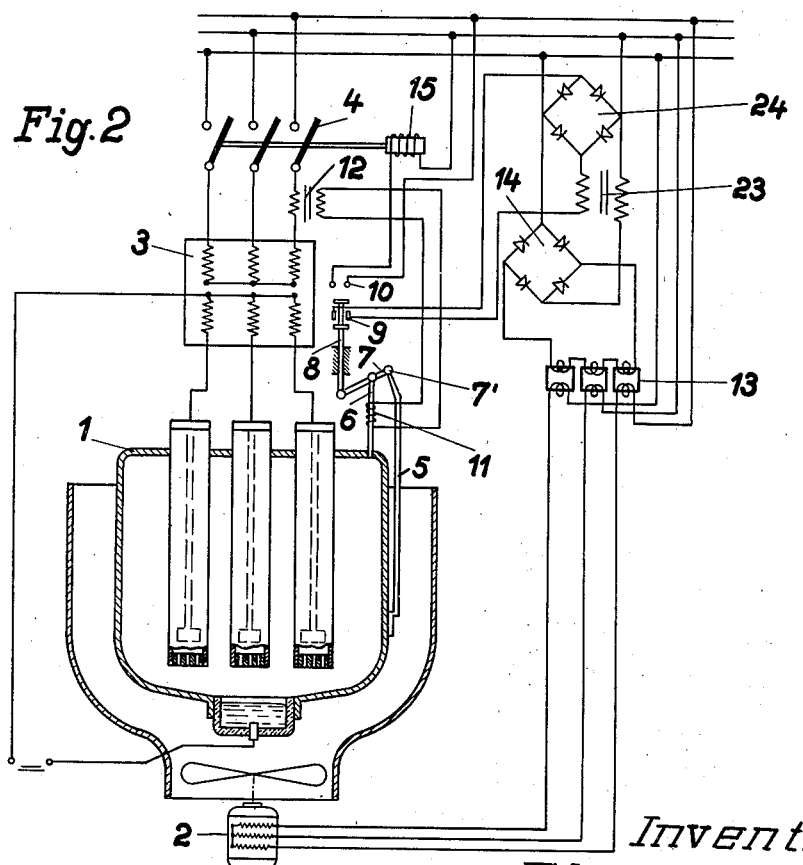
Figure 2 is a schematic diagram with parts in section showing a rectifier having means according to the invention for maintaining constant the vapor pressure in the vacuum vessel.

In Figure 2, 1 is a rectifier vessel the wall of which is of steel and which is sealed after exhaustion at temperatures of 300–400° by the vacuum pump. The rectifier is connected to the three-phase network through a transformer 3. For cooling the vessel there serves the fan 2 the motor of which is likewise fed by the three-phase network. The switching into and out of circuit of the fan motor is effected by means of premagnetized inductance coils 13, the alternating-current windings of which are included in the feeding circuit of the motor, whilst their premagnetizing windings are fed from the three-phase network through a rectifier aggregate 14, for example consisting of dry rectifiers. In the alternating-current circuit of the rectifier 14 there is also an iron-cored inductance coil 23, which can be premagnetized through another rectifier device 24. In the premagnetizing circuit of the inductance coil 23 there is the switch 8, 9 the movable contact 8 of which is operated by the heat-sensitive device constructed according to the invention.

The heat-sensitive device according to the invention consists of a part affected by the wall temperature of the vessel 1 and a part affected by the wall temperature and by the load current. Serving as the part of the heat-sensitive device that is influenced by the wall temperature only in the case of the constructional example here shown is the wall of the vessel 1 itself. On this wall there is directly placed a further expansion rod 6, for example of copper, which is heated by the temperature of the wall and by means of a heating coil 11. The heating coil is fed through a current transformer 12 which is inserted in a primary conductor of the rectifier. The bar 6 is coupled with a lever 7 with a large lever-arm ratio, which in its turn operates the contact 8. The lever 7 is fastened at a pivot 7' the spatial position of which is not varied on the variation of the temperature of the heat-sensitive device. For this purpose there is used a rod 5 of extremely small heat expansion, preferably of "invar", understood as comprising an alloy of carbon iron and nickel. This rod is fastened comparatively far down on the rectifier vessel or is erected separately in such a manner that on an expansion of the vessel wall and of the rod 6 the lever 7 is swung upwards and consequently the switch 8 bridges the contacts 9, which results in a premagnetization of the inductance coil 23 and consequently of the inductance coils 13. The voltage drop at the inductance coils 13 is consequently reduced practically to zero and the fan motor receives voltage and begins to rotate.

For the purpose of avoiding excess current the movable switch 8 is formed as a double switch and is arranged in such a manner that in the case of a specially heavy load and consequently in the case of a specially great expansion of the vessel wall 1 and of the rod 6 the circuit of a relay 15 is closed through contacts 10. The relay 15 then opens for example if required, after preliminary operation of warning signals, the three-phase main switch 4 of the apparatus.

Since the expansion of the rod 6 varies in proportion to the square of the load current, an increase of the load current takes place extraordinarily strongly in the case of heavy overloads. This has the result that the switching off time for the rectifier apparatus in consequence of the bridging of the contacts 10 becomes smaller the greater is the overload current for the time being. By suitable choice of the material of the road 6 it is brought about in this way that the heat disengager forms a thermic image of the current rectifier to be protected.

Another constructional example of the subject-matter of the invention is shown more diagrammatically in Figure 3. The expansion body 6 forms in this case a part of the secondary short-circuit of the current transformer 17 the primary coil 19 of which is traversed for example by the anode current. For the rest, the apparatus may agree with that shown in Figure 2. In many cases it may be advantageous to use bimetallic strips instead of rod-like expansion bodies. An application of this kind according to the invention is shown in Figures 4a and 4b. On the vessel 1 of the current rectifier there is erected a support 6 on which there is placed for example a flat sheet which is fastened on the "invar" rod 5 and is held by the spring 18. On this sheet there is located for example a bimetallic strip which is formed as a short-circuit winding 6' (Figure 4b) and which is heated by the heat of the vessel and further by a current transformer as explained for example by means of Figure 3 and which accordingly bends outwards. If the load of the current rectifier is small the operation of the switch 9 is effected substantially only by the expansion of the vessel 1. When the load is greater, on the contrary there is effected also a heating of the sheet 6' so that this is bent out supplementarily. The closing of the switch 9 will consequently in the case of a greater load take place already at lower temperatures of the vessel 1 than in the case of a small load.

In many cases it is advantageous, instead of solid bodies, to use for the heat-sensitive device liquids (mercury), for example in the form of contact thermometers. In Figure 5 there is shown an arrangement of this kind according to the invention. The contact thermometer 20' is in this case built with a long liquid column in a metal tube 20 which is welded to the current rectifier vessel so as to give good heat conduction. In its upper part the mercury of the thermometer is heated supplementarily by the heating winding 11. The winding may be fed either by an alternating current (anode current, excess voltage current) or directly by the direct current of the apparatus or by a part derived from the direct current. In the upper part of the contact thermometer there are fused the several contacts. On the closure of the first contact for example there is operated the fan motor or any other device for the variation of the cooling of the rectifier; if, however, the temperature, notwithstanding the cooling, rises above an allowable degree, a further contact can be closed whereby the switching off of the entire apparatus can be effected through relays.

For the purpose of achieving as nearly as possible the overload curve prescribed for most electrical apparatus (extremely short switching off periods at great overload, and longer switching off periods at smaller overload) it may be advantageous to make the time constant of the compounding device much smaller than that of the vessel. Advantageously there is then used the vapour tension of a substance for the operation of the contacts of the heat-sensitive device. In Figure 6 there is used by way of example as a heat-sensitive device a sort of liquid thermometer 21 with a metalic casing and with a pressure-sensitive manometer tube 22 for the operation of the contacts 9, 10. At the height of the liquid level the liquid is heated in the manner already described in detail by a current dependent on the load of the rectifier. In the case of small and medium loads the heating by means of the heating coil 11 may for example be only small and the switch 8 will consequently respond only substantially at the temperature of the vessel wall 1. In the case of a greater load, on the contrary, the liquid level of the thermo element is heated extremely powerfully by means of the winding 11, which causes a very quick vaporization of the liquid so that there may result an extremely quick switching off of the apparatus by the closure of the contacts 10. There is consequently obtained in this way a simple combination of the fan regulation (by the operation of the contacts 9) with an excess-current protection (operation of the contacts 10).

The employment of premagnetized inductance coils, described in detail in Figure 2, as switches for the circuit of the fan motor is specially advantageous because, when inductance coils, in particular when several inductance coils, are arranged in cascade fashion, as in Figure 2, only the comparatively small energy of the premagnetizing circuit need still be switched. This energy may however in most cases be controlled directly by the switching contacts of the heat-sensitive device, which is preferably made as a vacuum switch. If it be desired to do without the second rectifier arrangement 24, it may be suitable, with corresponding dimensioning of the inductance coil 23 to obtain the premagnetizing current for this inductance coil also from the rectifier 14. In other cases the inductance coil 23 may be dispensed with entirely and the switch 8, 9 then controls directly the premagnetizing current (direct-current circuit) of the inductance coil 13.

It is frequently also advantageous to control by means of the contacts of the heat-sensitive device relays which operate first the switches in the feeding circuit of the fan motor or in the case of excess current protection the main switch 4 of the apparatus.

The invention is of course not restricted to use in the case of air-cooled discharge vessels. In the case of current rectifiers with liquid cooling the arrangement is advantageously such that the contacts of the temperature-sensitive device operate relays for the regulation of the supply of liquid.

What I claim is:

1. In a metal-vapour current converting apparatus, an arrangement for keeping constant the vapour-pressure in the vessel, the arrangement consisting of a vapour pressure-controlling heat-sensitive expansion body, which is under the influence of the wall temperature of the vacuum vessel and is supplementarily heated in dependence on the load current and is adapted to regulate a cooling-medium current flowing around the vacuum vessel.

2. In a mercury-vapour current converting apparatus, an arrangement for keeping constant the vapour-pressure in the vessel, the arrangement consisting of a vapour pressure-controlling heat-sensitive expansion body, which is under the influence of the wall temperature of the vacuum vessel and is supplementarily heated in dependence on the load current, and an electrical relay circuit for switching in and out the cooling-medium current, the heat-sensitive body being adapted to operate on expansion a switch in the said relay circuit.

3. A mercury-vapour current-converting apparatus according to claim 2, the heat-sensitive expansion body consisting at least partially of a bimetallic strip.

4. In a mercury-vapour current-converting apparatus an arrangement for keeping constant the vapour-pressure in the vessel, the arrangement consisting of a heat-sensitive expansion body, which is under the influence of the wall temperature of the vacuum vessel and is supplementarily heated in dependence on the load current, an electrical relay circuit for switching in and out a cooling-medium current for the vessel, a second relay circuit for engaging and disengaging the main switch of the apparatus, the heat-sensitive expansion body being adapted to operate in dependence on the temperature of the vessel the switch in the relay circuit for the cooling-medium current and on the occurrence of overloading of the vessel the switch for the relay circuit of the main switch.

5. In a mercury-vapour current-converting apparatus with air cooling, an arrangement for keeping constant the vapour-pressure in the vessel, the arrangement consisting of a heat-sensitive expansion body, which is under the influence of the wall temperature of the vacuum vessel and is supplementarily heated in dependence on the load current, a motor for driving the fan producing the cooling current, a relay switch in the motor circuit of the fan, the heat sensitive body being adapted to close on expansion the relay switch in the fan circuit.

6. In a mercury-vapour current-converting apparatus, an arrangement for keeping constant the vapour-pressure in the vessel, the arrangement consisting of a heat-sensitive expansion body, which is directly in contact with the vessel wall and a supplementarily heated in dependence on the load current, a relay circuit for the regulation of the cooling-medium current, the expansion body being coupled with a rotatably mounted lever arm the free end of which operates a switch in the said relay circuit on expansion of the heat-sensitive body.

7. In a mercury-vapour current-converting apparatus, an arrangement for keeping constant the vapour-pressure in the vessel, the arrangement consisting of a heat-sensitive expansion rod, which bears directly on the vessel wall and is surrounded by a heating winding traversed by the load current, a second fixedly arranged rod of practically no heat expansion, the latter rod carrying at its end a lever arm which is adapted to operate on movement a relay switch for the regulation of the cooling-medium current, the heat-expansion rod being coupled likewise with the lever and being adapted to swing the lever out on variation of its position.

8. A mercury-vapour current-converting apparatus according to claim 6, the heat-expansion rod consisting of iron.

9. A mercury-vapour current-converting apparatus according to claim 6, the rod that has practically no heat expansion consisting of a metal of the "invar" type.

10. In a mercury-vapour current-converting apparatus with a metal wall an arrangement for keeping constant the vapour-pressure in the vessel, the arrangement consisting of an expansion rod erected on the upper portion of the vacuum vessel and heated in dependence on the wall temperature of the vessel and on the load current, another rod of practically no heat expansion, this second rod carrying at its free end a lever which can on swinging out close and open a relay circuit for regulating the cooling of the vessel, at its other end the rod being fastened to the peripheral wall of the vacuum vessel at a great distance from the point of attachment of the expansion rod, the expansion rod being coupled with said lever and being adapted to swing out the lever on heating and expansion both of the vessel wall and also of the expansion rod.

11. In a mercury-vapour current-converting apparatus an arrangement for keeping constant the vapour pressure in the vessel by affecting the cooling, the arrangement consisting of a heat-sensitive expansion body, which is under the influence of the wall temperature of the vacuum vessel and is supplementarily heated in dependence on the load current, there serving for the heating a current converter the primary winding of which is traversed by the anode current of the vessel and the secondary winding of which is formed at least partially by the heat-sensitive expansion body, and an electrical relay circuit for regulating the cooling-medium current, the heat-sensitive expansion body being adapted to operate a switch in the said relay circuit.

12. In a mercury-vapour current-converting apparatus, an arrangement for keeping constant the vapour-pressure in the vessel, the arrangement consisting of a heat-sensitive expansion body in the form of a constant thermometer, the thermometer bearing directly on the vessel wall and being heated supplementarily by the load current of the rectifier, the contacts of the thermometer being connected to relay circuits for regulating the cooling medium current and for switching off the apparatus in the case of excess load.

13. In a mercury-vapour current-converting apparatus an arrangement for keeping constant the vapour-pressure in the vessel by regulating the cooling, the arrangement consisting of a heat-expansion body in the form of a liquid thermometer which is in contact with the vessel wall and is heated supplementarily by the load current and to the vapour chamber of which is connected a manometer, the manometer being adapted to swing in the case of the impeding vaporization (occurring in dependence on the temperature) of the liquid in the said manometer and thermometer, and a relay circuit for regulating the cooling medium current of the apparatus, the switch of the relay circuit being coupled with the movable end of the manometer and being operated thereby.

EDUARD GERECKE.